(No Model.)
J. C. GLASS.
PRESSURE REGULATOR.
No. 399,663. Patented Mar. 19, 1889.
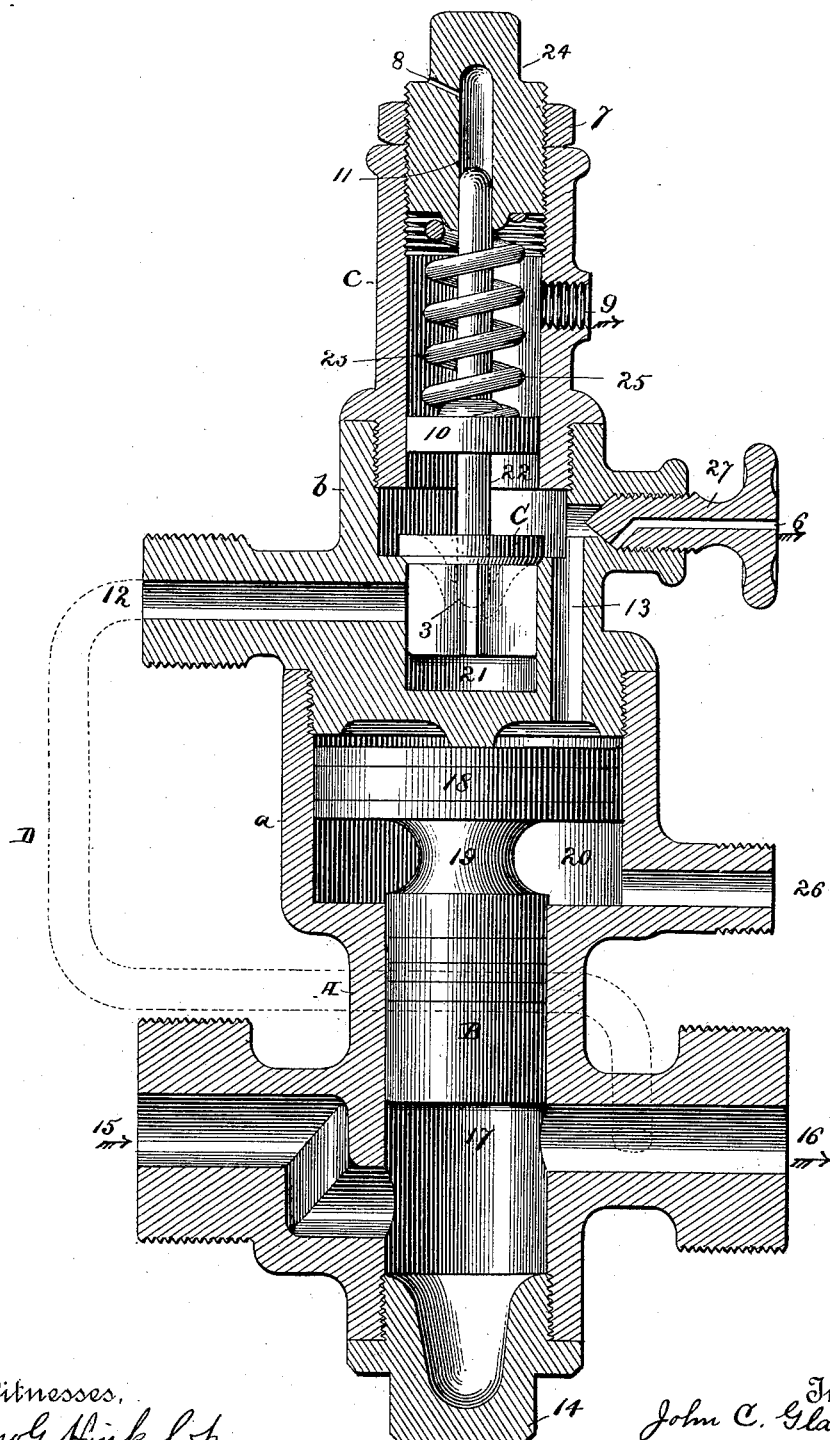
Witnesses,
Jno. G. Hinkel Jr.
Geo. H. Graham
Inventor,
John C. Glass,
By Foster & Freeman
Attorneys.

UNITED STATES PATENT OFFICE.

JOHN C. GLASS, OF VERONA, PENNSYLVANIA.

PRESSURE-REGULATOR.

SPECIFICATION forming part of Letters Patent No. 399,663, dated March 19, 1889.

Application filed May 9, 1888. Serial No. 273,324. (No model.)

*To all whom it may concern:*

Be it known that I, JOHN C. GLASS, a citizen of the United States, residing at Verona, Allegheny county, State of Pennsylvania, have invented certain new and useful Improvements in Pressure-Regulators, of which the following is a full, clear, and exact specification.

This invention relates to valves employed for the purpose of controlling, reducing, and regulating the supply or pressure of steam, water, and other fluids or vapors in pipes, reservoirs, cylinders, and other vessels; and it consists in the novel structure hereinafter fully set forth, whereby is provided a regulator simplified in construction and operation.

The improved pressure-regulator comprises, essentially, a main valve adapted to control or regulate the flow of steam, air, water, &c., hereinafter called the "high-pressure fluid;" an actuating-piston for said valve that is operated by the steam, air, water, &c., that has passed the said main valve, and hereinafter called the "low-pressure fluid," and an auxiliary valve held to its seat by a suitable spring against the ordinary force of the low-pressure fluid and raised from its seat thereby, when its pressure exceeds a predetermined point to which the spring has been set, thus permitting said low-pressure fluid to exert its force upon the piston of the main valve to actuate it and control the further flow of high-pressure fluid, together with a single communication with the low-pressure fluid and the main valve, which communication is controlled by the auxiliary valve that is operated by the excess of pressure of said fluid passing to the auxiliary and main valves through said single communication.

The piston of the main valve in area is relatively larger than that of the valve, so that the pressure exerted upon the piston will be sufficient to overbalance that upon the valve, and thus is adapted to close the latter against the high-pressure fluid. When the low-pressure fluid lowers sufficiently in pressure, so that it no longer exceeds or equals that of the pressure of the spring upon the auxiliary valve, the latter will close and the piston and main valve will return to their normal open positions, permitting a free flow of the fluid until the low-pressure fluid again exceeds the predetermined pressure, when the operation of the auxiliary and main valves will be repeated.

The accompanying drawing illustrates by longitudinal sectional elevation a pressure-regulator embodying the present improvements.

The pressure-regulator consists of a shell, A, having the usual induction-port, 15, and eduction-port 16, the flow of the fluid from the one port to the other being controlled by the main valve B. This valve is of plunger form, provided with suitable packing-rings to prevent the escape of the high-pressure fluid past it, and is adapted to reciprocate in a suitably-shaped cylinder, 17, provided by the regulator-shell A, the lower end of the cylinder being closed by a screw-threaded cap, 14. The entrance end of the induction-port 15 to the cylinder 17 is preferably somewhat lower than that of the eduction-port 16, by means of which the valve, when moved to control the flow of fluid, will close the last-named port and reach the limit of its movement in that direction before closing the induction-port, and hence the high-pressure fluid may constantly exert its force upon one side of the valve. This main valve is provided with a piston, 18, connected therewith by a slightly-contracted neck, 19, and is adapted to reciprocate in a cylinder, 20, also formed by the shell A, and extending from the cylinder 17, occupied by the main valve. The piston is of larger area than that of the valve, thus presenting an area to the low-pressure fluid sufficient to enable it to overbalance that of the high-pressure fluid upon the valve. Said piston is provided with a suitable packing-ring to prevent the escape of fluid past it, and its cylinder 20 is of a length sufficient to permit the piston to move the valve the distance required to open and close the eduction-port 16 without closing the induction-port 15.

The low-pressure fluid for actuating the valve-piston 18 enters the regulator-shell A through an orifice, 12, that is controlled by an auxiliary valve, C, and by a passage, 13, to one end of the cylinder 20, (the upper end, as shown,) and upon one side of said piston. The orifice 12 may be connected in any suitable manner with the low-pressure fluid, as, for instance, by a pipe, D, shown in dotted lines, communicating with a similar pipe extending from the eduction-orifice 16 of the regulator.

The auxiliary valve C is provided with an annular seat adapted to rest upon a like seat provided on a pocket, 21, into which the orifice 12 opens. The valve is also provided with a stem, 22, extending into a chamber, 23, formed by an extension of the regulator-shell A and into an elongated guiding-recess, 11, provided in one end of an adjustable screw-threaded cap, 24, closing the end of the chamber. A spring, 25, is interposed between the end of the cap 24 and a rest, 10, carried by the stem, by which the valve is pressed to its seat on the pocket to close the orifice 12.

In the preferred construction the auxiliary valve proper and its stem are made independently, the end 3 of the stem being seated in a recess in the valve, and the rest 10 is made large enough to fit the chamber 23, and by it and the elongated recess in the cap 24 is properly guided during the movements of the said valve in admitting and cutting off the low-pressure fluid to and from the cylinder 20.

In order to prevent the accumulation of any fluid in the cylinder below the valve-piston 18, by leaking past the latter, that would tend to retard the movement thereof, the lower end of the cylinder is provided with an escape-opening, 26, that may be connected by any suitable means with a waste, to which any fluid passing the piston may flow. Upon the opposite side of the piston I also provide a relief-valve, 27, provided with a screw-threaded stem seated in a similar threaded opening in the regulator-shell, having a conical end and a central passage, 6, which passage is closed when the conical end of the stem is seated against a like-shaped seat at the inner end of the opening in the shell, and is open when withdrawn a slight distance from said seat, by means of which the speed at which the piston will move under the pressure exerted by the low-pressure fluid may be controlled by permitting some of said fluid to escape by said passage 6 or not, as desired. The chamber 23, occupied by the spring 25 and valve-stem 22, may also be provided with an escape-opening, 9, and the elongated recess in the cap 24 with an opening, 8, through which any accumulation of the fluid, air, &c., may pass, and thus prevent the retardation to the valves therein.

The screw-threaded cap 24 is adjustable in the end of the chamber 23, so as to regulate the tension of the spring 25 and the force at which the auxiliary valve C is held to its seat against the pressure of the low-pressure fluid; and hence the pressure at which the said valve will be raised, thereby to actuate the valve-piston 18, may be regulated as the exigencies of the use of the improved regulator may require. The cap 24 may be provided with a jam-nut, 7, to prevent its accidental movement.

In the practical construction of the improved regulator its shell, as shown, will preferably be formed of three separable parts, $a\ b\ c$, the part $a$ containing the cylinders 17 and 20, the part $b$ forming an end to the cylinder 20 and containing the pocket 21, and the part $c$ containing the spring and valve-stem chamber 23; and these three parts may be screw-threaded together, as shown, or be connected by bolts passing through holes in flanges formed on the abutting portions of the various parts.

From the foregoing description of the construction and arrangement of the improved regulator, its operation will be readily understood, it being sufficient to state that the main valve is constantly exposed to the high-pressure fluid, and that so long as the auxiliary valve is seated its free passage from the induction-orifice to the eduction-orifice will be unobstructed; that so soon as the low-pressure fluid rises in pressure sufficiently to overcome the pressure of the spring 25 upon the auxiliary valve the latter will be raised from its seat and allow the said fluid to pass by passage 13 into the cylinder 20 to exert its force upon the valve-piston and cause it to be reciprocated to move the main valve over or partially over the eduction-orifice to control or regulate the further passage of the high-pressure fluid therethrough until such time as the pressure of the low-pressure fluid drops to its predetermined point and ceases to exert sufficient force upon the auxiliary valve to keep it open, when the latter will move to its seat, cutting off said pressure from the valve-piston and permitting the valve and valve-piston to return to its normal position.

The position of the main valve is thus governed by the varying pressure of the fluid after it has passed the regulator—or, in other words, after it has passed the said valve—so that said pressure is employed instead of the high-pressure fluid, as has commonly been the case. It will also be observed that by the improved structure it effects the movement of the main or controlling valve by a single connection, and that the fluid through this connection operates both the auxiliary valve and the main valve.

What I claim is—

1. In a high-pressure regulator, a main valve constantly exposed to the high-pressure fluid, a piston the area of which is larger than the main valve, low-pressure-fluid connections with one side of the piston, and an auxiliary valve controlling the flow of low-pressure fluid to the main valve and operated thereby, substantially as described.

2. In a high-pressure regulator, a main valve and its cylinder, a valve-piston of larger area than the valve and its cylinder, low-pressure-fluid connections with one side of the piston-cylinder, and an auxiliary valve controlling the flow of low-pressure fluid to the main valve and operated thereby, whereby a rise of pressure of the low-pressure fluid will open the auxiliary valve and operate the piston and main valve, substantially as described.

3. In a high-pressure regulator, a main valve constantly exposed to the high-pressure fluid, a piston the area of which is larger than the main valve, low-pressure-fluid connections with one side of the piston, an auxiliary valve controlling the flow of low-pressure fluid to the main valve and operated thereby, and a relief-valve between the auxiliary valve and piston, substantially as described.

In testimony whereof I have signed my name to this specification in the presence of two subscribing witnesses.

JOHN C. GLASS.

Witnesses:
C. C. LEE,
LA RUE TIERS.